United States Patent
Yapel et al.

(10) Patent No.: US 8,355,809 B2
(45) Date of Patent: Jan. 15, 2013

(54) SYSTEM AND METHOD FOR DESIGNING A DIE TO YIELD A DESIRED COATING UNIFORMITY

(75) Inventors: Robert A. Yapel, Oakdale, MN (US);
Robert B. Secor, Stillwater, MN (US);
Michael J. Tichy, Henning, MN (US);
Bruce D. Shalles, River Falls, WI (US);
Charles N. DeVore, Hugo, MN (US);
Jennifer L. Trice, Hugo, MN (US);
James M. Nelson, Woodbury, MN (US);
Andrzej P. Jaworski, Woodbury, MN (US); William R. Dudley, Geneseo, NY (US); Keith R. Bruesewitz, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1008 days.

(21) Appl. No.: 12/303,768

(22) PCT Filed: Jun. 25, 2007

(86) PCT No.: PCT/US2007/071964
§ 371 (c)(1),
(2), (4) Date: Dec. 8, 2008

(87) PCT Pub. No.: WO2008/005726
PCT Pub. Date: Jan. 10, 2008

(65) Prior Publication Data
US 2010/0168894 A1 Jul. 1, 2010

Related U.S. Application Data

(60) Provisional application No. 60/817,884, filed on Jun. 30, 2006.

(51) Int. Cl.
*G06F 19/00* (2006.01)
(52) U.S. Cl. .................. 700/117; 29/527.2; 264/176.1
(58) Field of Classification Search ............. 29/527.2; 700/117, 122, 123, 17, 32, 33, 83, 95, 97, 700/159, 160, 164; 53/122, 127, 346, 348; 227/23, 62; 264/3.3, 176.1, 177.1, 539, 540, 264/541
See application file for complete search history.

(56) References Cited

U.S. PATENT DOCUMENTS

| | | | |
|---|---|---|---|
| 4,984,533 A | 1/1991 | Takahashi et al. | |
| 5,655,948 A | 8/1997 | Yapel et al. | |
| 5,851,137 A | 12/1998 | Bhave et al. | |
| 6,418,604 B1 | 7/2002 | Edman et al. | |
| 6,720,025 B2 | 4/2004 | Yapel et al. | |
| 6,813,820 B2 | 11/2004 | Nelson et al. | |
| 2006/0064288 A1* | 3/2006 | Ferryanto et al. | 703/2 |
| 2006/0269673 A1 | 11/2006 | Yapel | |
| 2007/0023112 A1* | 2/2007 | Campbell et al. | 148/577 |

* cited by examiner

*Primary Examiner* — Carlos Ortiz Rodriguez
(74) *Attorney, Agent, or Firm* — Douglas B. Little; James A. Baker (57) ABSTRACT

Computer implemented method for making a die includes: selecting coating uniformity required to produce a particular coated product with the die and a value for one or more dimensions of the die; determining (using a mathematical model determined by regression analysis) total indicated runout (TIR) of a die surface and dimensions of the die not having a user specified value; and machining die part or parts to the determined TIR and dimensions. A thermal treatment process for reducing the number of finishing (e.g., grinding) cycles needed to produce a desired die flatness is provided. A coating fluid rheological characteristic can be an input to the method.

14 Claims, 7 Drawing Sheets

SYSTEM AND METHOD FOR DESIGNING A DIE TO YIELD A DESIRED COATING UNIFORMITY

CROSS-REFERENCE

This application claims the benefit under U.S.C. §119(e) of U.S. Provisional No. 60/817,884 filed Jun. 30, 2006, which is incorporated by reference herein.

TECHNICAL FIELD

The present document relates generally to die coating and extrusion, and more particularly to a system and computer-implemented method for designing a die to yield a desired coating uniformity.

BACKGROUND

The production of high quality articles, particularly electronic, tape, optical, photographic, photothermographic, thermographic, abrasives, adhesive, display, and pharmaceutical articles, oftentimes depends on the ability to reliably and uniformly apply a thin film of a coating solution onto a continuously moving substrate or web. Thin films can be applied using a variety of techniques, including dip coating, forward and reverse roll coating, wire wound rod coating, and die type coating. Die coaters include knife coaters, slot coaters, slide coaters, slide curtain coaters, drop die curtain coaters, and extrusion coaters among others. Many types of die coaters are described in the literature, such as by Edward Cohen and Edgar Gutoff, *Modern Coating and Drying Technology* (VCH Publishers: NY 1992, ISBN 3-527-28246-7), and Gutoff and Cohen, *Coating and Drying Defects Troubleshooting Operating Problems* (Wiley Interscience, NY, ISBN 0-471-59810-0), and *Liquid Film Coating*, (Chapman and Hall, Eds, NY, 1997, ISBN 0-142-06481-2

Die coating is a process whereby a pressurized stream of coating material is moved through an internal cavity or reservoir of a die coater and discharged from an applicator slot to form a ribbon of coating material. As mentioned previously, it is important that the applied coating, i.e., the ribbon, exhibit uniformity. By "uniformity," it is meant that the applied coating should measure substantially the same thickness throughout the ribbon. Uniformity of the applied coating is especially important for products used in critical optical or electronic applications. (Coatings can be applied as a single layer or as two or more superimposed layers upon a substrate. Although it is usually most convenient for the substrate to be in the form of a continuous web, a substrate may also be formed as a succession of discrete sheets.) The uniformity of the coating layer is influenced by the precision of the geometry of the coating slot through which the coating layer (or extrudate) passes.

All die coaters have at least one slot. Each slot has a slot length corresponding to the cross-sectional width of the applied coating, a slot width corresponding to the distance from the internal cavity to the exit of the slot, and a slot height, which is the narrow dimension of the slot between the two parallel surfaces defining the slot, itself. One of the fundamental problems associated with die type coaters is the ability to accomplish a uniform flow per unit width across the entire length of the slot of the die. A fundamental issue in attaining this uniformity of the flow, and thus the critical uniformity of the applied coating, is the ability to construct a die with the best possible precision of the die slot "height" (e.g., a uniform die slot "height" across the entire width of the slot).

It is desirable to construct an applicator slot that exhibits a constant height across the entire length of the slot. Any variation in the slot die height degrades the uniformity of the applied coating discharged therefrom. The uniformity of an applicator slot height is a function of, amongst other things, the geometry of the two halves of the die forming the applicator slot. It is therefore desirable to understand the influence of geometric choices concerning the two halves of the die upon the expected uniformity of the applicator slot height.

SUMMARY OF THE INVENTION

According to some embodiments, a computer implemented system and method for selecting dimensions of a die may include prompting a user to select a coating uniformity required by a product to be applied by the die. The method may include prompting a user to select a coating uniformity required to produce a particular coated product with the die. The user may also be prompted to select a slot height of the die. In some embodiments, the user may specify a value for one or more dimensions of the die. The method may then determine the total indicated run-out (TIR) of the die slot, the die part surface flatness, and/or the coated product uniformity, as a function of the dimensions of the die not having a user specified value. In some embodiments, a method for designing a coating die to achieve a desired coating uniformity with a particular coating fluid having a specified rheological characteristic is disclosed. In additional embodiments, the method provides a thermal treatment process for reducing the number of finishing (e.g. grinding) cycles needed to produce a desired die flatness.

DETAILED DESCRIPTION

Figure 1A:
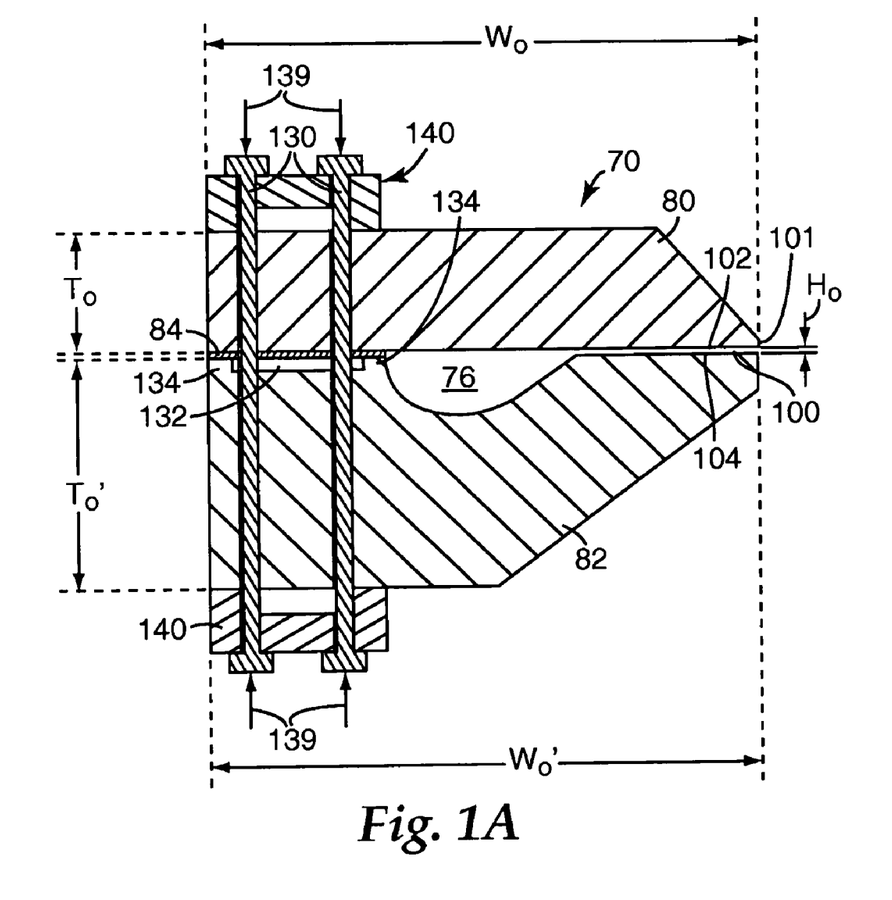
FIG. 1A depicts an exemplary embodiment of a coating die in cross-section.

FIG. 1 depicts an exemplary embodiment of a die coater 70 in cross-section. Die coaters of many varieties and forms are known. The particular die coater 70 depicted in FIG. 1 is presented for the sake of illustration, so that the various embodiments of the system and method for design of a die coater may be explained by reference thereto. The various embodiments of the system and method are applicable to die coaters of any configuration, variety and/or form, and are not limited in applicability to the particular die coater 70 depicted in FIG. 1. Further, in the description of the embodiments which follows, the term "die half" is used to describe a portion of a multipart die. However, one skilled in the art understands that the parts of a multipart die need not be equal in volume, mass, or extent, and therefore the term "die half" is used synonymously with the term "die portion."

Figure 1B:
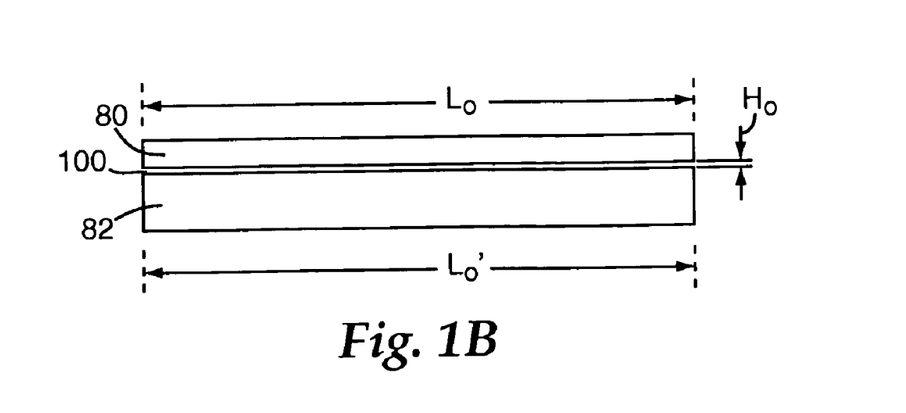
FIG. 1B depicts an exemplary embodiment of the applicator slot of the coating die of FIG. 1A in end view.

As can be seen from FIG. 1A, the die coater 70 includes a first die half 80, having a specified thickness $T_o$, a width $W_o$, and as shown in FIG. 1B, a length $L_o$; and a second die half 82, having a thickness $T_o'$, a width $W_o'$, and as shown in FIG. 1B, a length $L_o'$. Each of $T_o$ and $T_o'$, $W_o$ and $W_o'$, and $L_o$ and $L_o'$ may be of the same or of a different dimension. A shim 84 rests upon a pair of landings 134 defined by a recess 132 in the second die half 82. Thus, the shim 84 is thereby interposed between the first die half 80 and the second die half 82. The thickness of the shim 84 determines the specified slot height, denoted by reference character $H_o$.

The two halves 80 and 82 of the die coater 70 are held together by a brace 140, which generates a clamping force in the direction indicated by arrows 139. The aforementioned clamping force 139 is generated by a pair of threaded fasteners 130 that extend through the brace 140, each half 80 and 82 of the die 70, and the shim 84.

The first and second die halves 80 and 82 cooperate to form an internal cavity or manifold 76. During operation, coating material (e.g. a coating fluid) is introduced into the internal cavity through a supply line (not depicted in FIG. 1), and is discharged from an applicator slot 100 at the die exit 101, thereby forming an applied coating or ribbon upon a substrate. (Additionally, a die coater may be used to create an extrusion. The various embodiments of the system and method presented herein are equally applicable to a die used for extrusion. For the sake of illustration only, the die herein is discussed in the context of die coating.)

As shown in FIG. 1B, the applicator slot 100 exhibits a length, $L_o$ (which equals $L_o'$ in FIG. 1B) which is measured in the direction running in and out of the page of FIG. 1A. The length of the applicator slot 100 corresponds generally to the width of the applied coating. The applicator slot 100 also exhibits a width, which is the distance between the internal cavity 76 to the exit of the applicator slot 100.

The applicator slot 100 is defined by a die surface 102 of the first die half 80 and die surface 104 of the second die half 82. As mentioned previously, it is desirable for the height $H_o$ of the applicator slot 100 to be substantially constant throughout its length and width. For the applicator slot 100 to exhibit a substantially constant height $H_o$ throughout its length and width, the aforementioned die surface 102 and 104 should be substantially flat.

It is impossible to machine a physical body to a precise specification. Therefore, it is impossible to machine the die halves 80 and 82, so as to yield perfectly flat surfaces 102 and 104. In light of this, it is important to understand just how flat the surfaces 102 and 104 should be in the context of delivering a coating for a given product.

The flatness of a surface, such as a die surface is oftentimes measured in total indicated run-out (TIR), which is calculated as the difference between the maximum positive displacement (i.e., "upward displacement") of the surface and the maximum negative displacement (i.e., "downward displacement") of the surface. In other words, TIR of a surface is a peak-to-valley measurement. Similarly, the uniformity of a slot, such as an applicator slot is also characterized by TIR. In the case of a slot, the TIR is found by examination of the two surfaces defining the slot. Specifically, the TIR is calculated as the difference between the maximum displacement of the first surface in the direction opposite the second surface (i.e. the maximum displacement between surfaces 104 and 102 in FIG. 1) and the minimum displacement of the second surface in the direction opposite the first surface (i.e. the minimum displacement between surfaces 102 and 104 in FIG. 1).

In the context of designing a die to produce a particular product, one of the initial variables that may be specified is the required coating uniformity for the product. The coating uniformity is defined as:

$$\text{Coating Uniformity (\%)} = 100 \frac{[\text{Thickness}_{Max} - \text{Thickness}_{Min}]}{\text{Thickness}_{Avg}} \quad \text{(Equation 1)}$$

where $\text{Thickness}_{Max}$ represents the maximum thickness that may be exhibited by the coating, $\text{Thickness}_{Min}$ represents the minimum thickness that may be exhibited by the coating, and $\text{Thickness}_{Avg}$, represents the average thickness to be exhibited by the coating. In other words, coating uniformity is a percentage value describing the extent to which the coating may vary from its intended thickness, while still rendering an acceptable product.

Another variable that may be specified at the outset of the die design effort is the intended applicator slot height, $H_o$. The specified slot height $H_o$ is a function of variables known to those of skill in the art. These variables are largely independent of the geometry of the die, and include, without limitation, the thickness of the coating to be achieved (which is known at the outset of an effort to design a die to produce a given product), the type of coating material to be discharged from the applicator slot, and the type of coating method to be employed.

Figure 2:
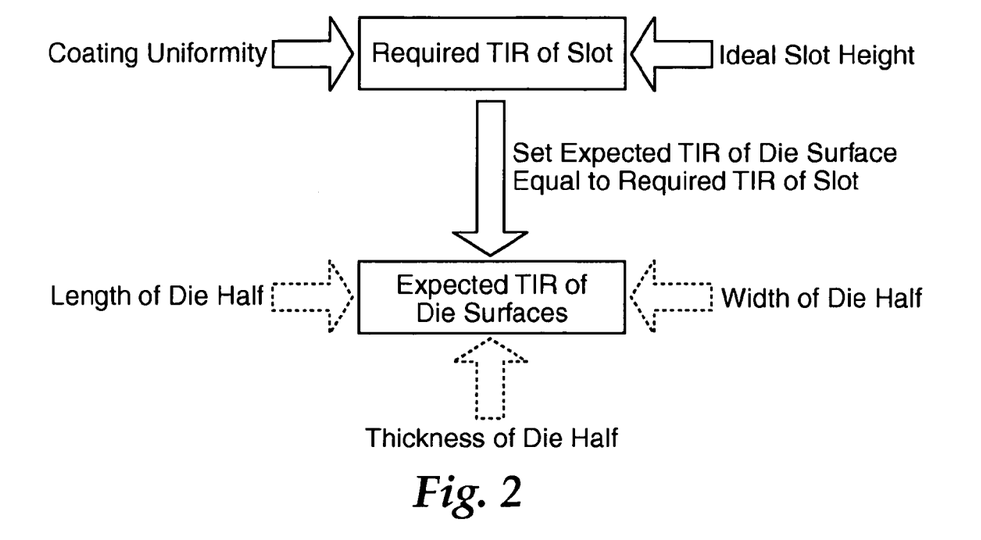
FIG. 2 depicts the relationship between coating uniformity, slot height, TIR of an applicator slot, and the geometry and/or various dimensions of a die.

As can be seen from FIG. 2, the specified coating uniformity of the product and the specified slot height $H_o$ determine the required TIR of the slot. Specifically, the TIR of the slot may be related to the coating uniformity, the rheological characteristics of the coating material, and the selected slot height by the following equation:

$$\text{Coating Uniformity} = \frac{(H_o + t/2)^{(2+1/n)} - (H_o - t/2)^{(2+1/n)}}{H_o^{(2+1/n)}} \quad \text{(Equation 2)}$$

where $H_o$ represents the slot height, t represents the TIR of the slot, and n represents the power law index (i.e. a rheological parameter) of the coating material discharged through the applicator slot (For Newtonian fluids, n=1). By solving the above equation for t, the required TIR of the slot may be found. This relationship is recited in U.S. Pat. No. 6,813,820.

The TIR of the slot is, of course, a function of the TIR of the two surfaces defining the slot. Unexpectedly, the TIR of the surfaces is a function of the geometry of the bodies bearing the surfaces. In the context of the applicator slot 100 of FIG. 1, for example, the TIR of the applicator slot 100 is a function of the TIR of surfaces 102 and 104. The TIR of surface 102 is a function of the geometry of first die half 80; the TIR of surface 104 is a function of the geometry of the second die half 82. More specifically, the TIR of surface 102 is a function of the overall width of the first die half 80 (shown in FIG. 1), the overall thickness of the first die half 80, and the overall length of the first die half 80 (measured in the direction running in and out of the page). Similarly, the TIR of surface 104 is a function of the overall width of the second die half 82 (shown in FIG. 1), the overall thickness of the second die half 82, and the overall length of the second die half 82 (again, measured in the direction running in and out of the page).

Thus, as shown by FIG. 2, if the relationship between the TIR of the die surfaces 102 and 104 and the geometry of the die halves 80 and 82 can be found, then the TIR of the die surfaces may be set equal to the required TIR of the slot, and the acceptable range of length, height, and width of the die halves may be found. According to some embodiments, the TIR of the die surfaces may be set equal to some fraction of the required TIR of the slot, such as one-half of the required TIR of the slot.

To find the relationship between the TIR of the die surfaces 102 and 104 and the geometry of the die halves 80 and 82, an experimental set of dies are machined, and the TIR of each member of the set is measured. The machining variables other than the geometry of the die halves 80 and 82 should be held substantially constant, to the extent feasible. A set of die halves are then machined with various dimensions of each of the members thereof being varied, so as to adequately represent the full range of the reasonably expected extents of each dimension. The TIR of each die half is then measured, and a regression is performed, finding the relationship between the varied dimensions of the die halves and the TIR thereof.

Figure 3:
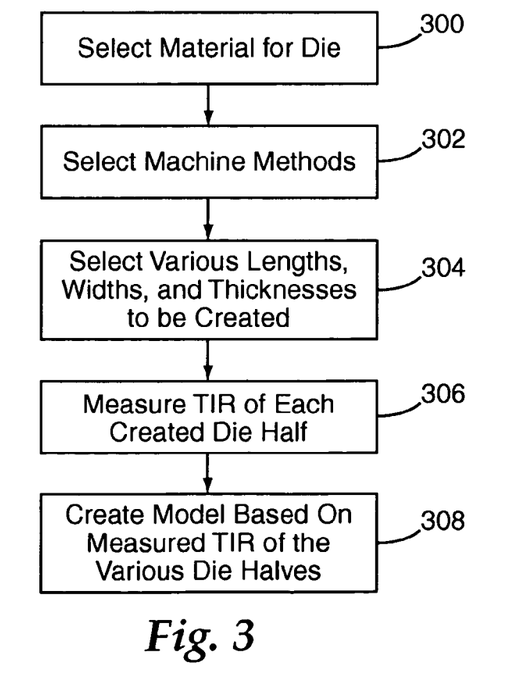
FIG. 3 depicts an exemplary embodiment of a method for obtaining a model of TIR as a function of the dimensions of the die.

FIG. 3 depicts an exemplary embodiment of such a method. Operations 300-302 relate to holding constant machining variables to the extent feasible. For example, in operation 300, the material out of which the various die halves of the experimental set are made (heat treatment may also be selected). In addition to selecting the material, the direction of the grain relative to the geometry (e.g., length, etc.) may be selected. Also, in operation 302 the machining methods (and parameters thereof) used to create each of the die halves of the experimental set may be selected. For example, the following, without limitation, may be selected: (1) the sequence of operations undergone by each of the die halves of the experimental set (e.g., each die half will undergo a milling operation followed by a quantity of N grinding operations); (2) the amount of material to be removed during each machining operation; (3) the operational speed of the various machining tools is chosen; (4) the rate of feed of the die halves during the various machining operations; and/or (5) the particular variety and prior use history of any interchangeable machining tool employed in each machining operation. Of course, any other machining variable, to the extent possible, may be selected during operation 302 and held constant.

Operation 304 relates to selecting the various dimensions of the various dies of the experimental set, so as to adequately represent the full range of the reasonably expected extents of each dimension. For example, the overall lengths, widths, and thicknesses of the various die halves of the experimental set may be selected. Thus, if a die is reasonably anticipated to have a length of between 30 and 50 inches, dies having lengths of 30, 32, 34, 36, 38, 40, 42, 44, 46, 48, and 50 inches may be selected. Similarly, if a die is reasonably expected to have a width or thickness between 2 and 10 inches, dies having width and thickness of 2, 4, 6, 8, and 10 inches may be selected. In the context of the preceeding example, a quantity of (11*5*5) permutations of the various selected lengths, widths, and thicknesses are machined according to the parameters chosen in operations 300 and 302. In general, in operation 304, an experimental set of dies having dimensions representing the reasonably expected ranges of useful dies according to a designed experiment are selected and machined.

After the machining of each of the experimental die halves, the TIR of the particular surface of each die half that defines the slot is measured (operation 306). Then, a regression of the TIR measurements as a function of the lengths, widths, and thicknesses of each of the dies is found (operation 308). For example, the regression may generate a formula in the form of Equation 3 for the first die half 80 in FIG. 1:

$$\text{TIR}=C_1+C_2L_o+C_3W_o+C_4T_o+C_5L_o^2+C_6W_o^2+C_7T_o^2+ \\ C_8L_oW_o+C_9L_oT_o+C_{10}W_oT_o \quad \text{(Equation 3)}$$

where $C_1$-$C_{10}$ represents constants found by the regression of operation 308, $L_o$ represents the specified (i.e. selected) overall length of a die half, $W_o$ represents the specified overall width of the die half, and $T_o$ represents the specified overall thickness of the die half. Thus, in the wake of finding the regression in operation 308, the anticipated TIR of a proposed die surface may be found in light of a selected overall length, width, and thickness of the proposed die. Of course, one skilled in the art understands that a like calculation of TIR may be performed for the second die half 82 in FIG. 1 by substitution of $L_o'$, $W_o'$, and $T_o'$ for $L_o$, $W_o$, and $T_o$, respectively, in Equation 3.

Figure 4:
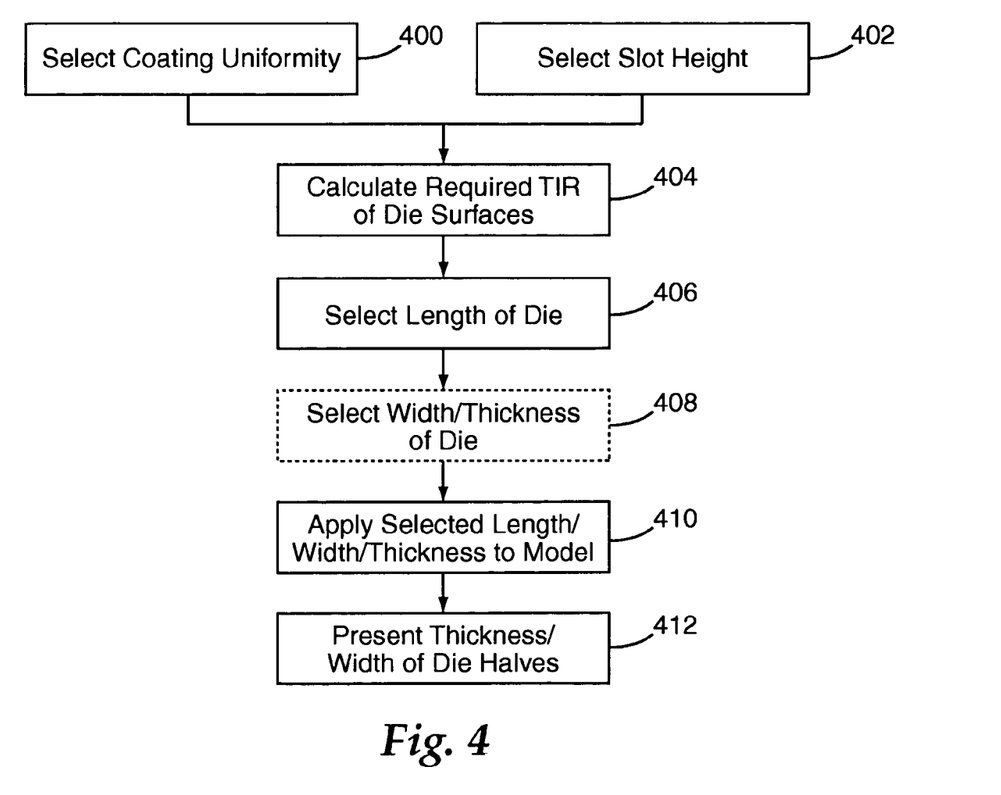
FIG. 4 depicts an exemplary embodiment of a method for presenting appropriate dimensions for a die.

Based on the principles discussed with reference to FIGS. 1-3, software executing the operations of FIG. 4 may assist in the design of a die. The software may be executed by a general-purpose computing device. As understood by those of ordinary skill in the art, a general-purpose computing device includes a processor that is coupled to one or more stages of memory that store software and data. The processor communicates, via an input/output (I/O) bus, with various input, output, and communication devices, including a display, such as a monitor, and may communicate with a keyboard, a mouse or other pointing device, such as a touch pad, and/or speakers, to name a few such devices. Various peripheral devices may also communicate with the processor via the I/O bus, including a network interface card, a hard disc drive, or other mass data storage device, removable media drives, such as a CD ROM drive or a DVD drive (which may be both readable and writable), a wireless interface, etc. It is understood that computing devices presently employ many chip sets and architectures. The methods disclosed herein may execute upon all such chip sets and architectures, and may be embodied as instructions that are stored upon a computer-readable medium or encoded upon carrier signal that may be communicated across a network.

As shown in operation 400 (see FIG. 4), a user of a computing device may be presented a user interface that prompts the user to enter a coating uniformity to be attained by the die. Also, the user interface may prompt the user to enter the applicator slot height (operation 402). Thereafter, the computer calculates the required TIR of the die surfaces (operation 404). Such calculation may be performed, for example, by solving Equation 2 for t. Also, numerical methods for finding t in view of the relationship presented in Equation 2 may be employed for finding and/or approximating t. Such numerical methods may be useful, for example, where n≠1.

The user interface may prompt the user to select the specified overall length of the die, as shown in operation 406. As described previously, the length of the die is determined in large part by the applicator slot length, which, in turn, is determined by the required width of the applied coating. Optionally, the user interface may include one or more fields for the entry of the overall width and/or thickness of the die (operation 408). A user of the software package may enter data into one of these fields, should he or she already know one of those values.

As shown in operation 410, the value(s) entered during operations 406 and 408 are applied to the model (i.e., regression) of the manufacturing process, to determine the range of acceptable values for the values not entered during operations 406 and 408. This step may be performed by use of equation 3. For example, assuming that the overall length of the die is entered in operation 406, and the overall width of the die is entered during operation 408, then the computing device employs equation 3 to solve for the sole remaining unknown, overall thickness of the die halves. The overall thickness is then presented to the user (operation 412), and the die halves may be machined according to the overall length, height, and thickness presented and/or entered via the user interface. These die halves will yield the required coating uniformity.

Assuming that the specified overall length of the die halves is entered during operation 406, but that no specified width or thickness is entered during operation 408, then the computing device uses equation 3 to find a range of thicknesses and widths that yield the required TIR. For example, the computing device may execute a nested loop, so as to step the thickness and width variables through their respective range of reasonably expected values, and the resulting TIR of each such combination of values may be calculated (again, by use of Equation 3). Then, the results may be presented to the user (operation 412).

Figure 5:
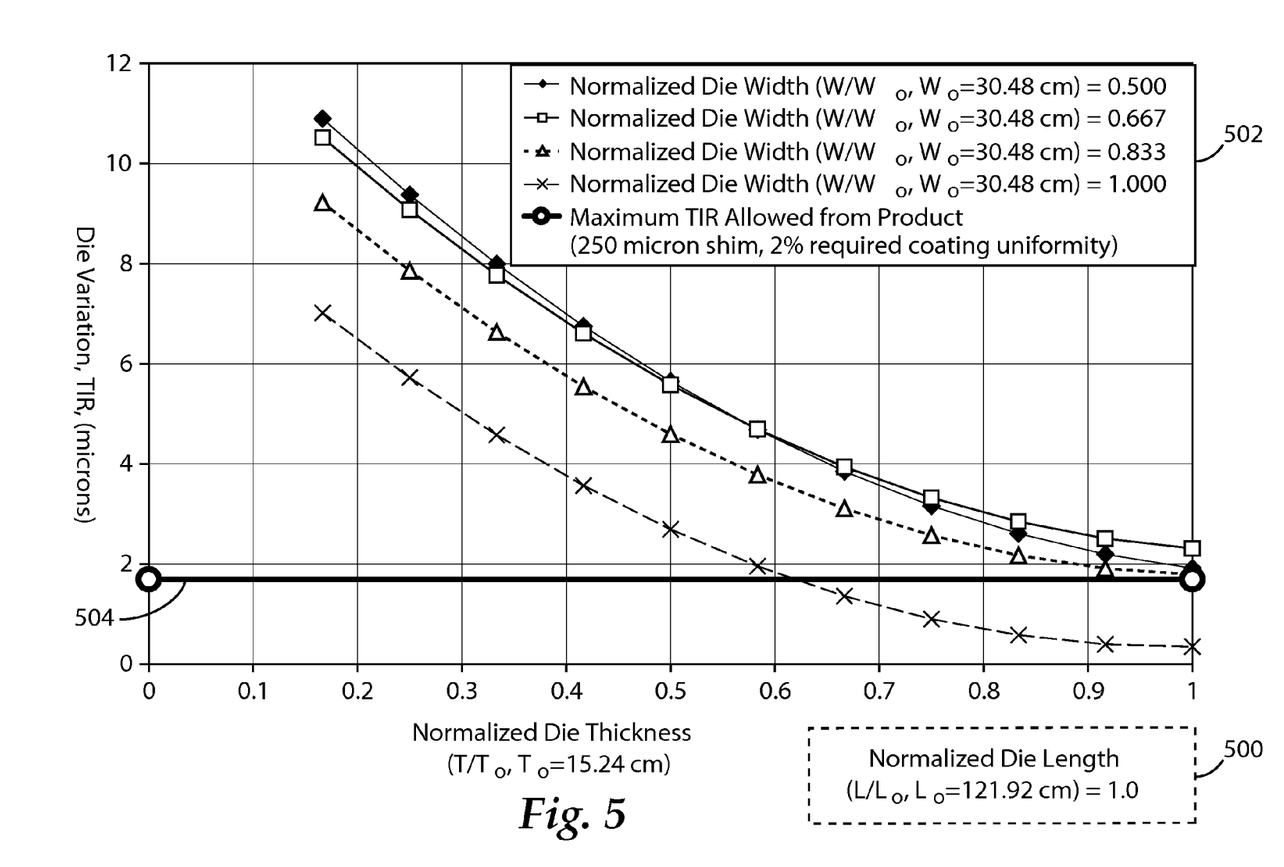
FIG. 5 depicts an exemplary embodiment of a screen for presenting TIR as a function of dimensions of the die.

FIG. 5 depicts one embodiment of presenting the acceptable ranges for two unspecified dimensions, in light of a third specified dimension. In the particular embodiment depicted in FIG. 5, the selected dimension is the specified overall length of the die halves (assuming $L_o=L_o'$), as shown by reference numeral 500. The overall thickness T and width W of the die halves were unspecified in this example; however, a maximum desired die thickness $T_o$ (assuming $T_o=T_o'$) and maximum desired die width $W_o$ (assuming $W_o=W_o'$) were selected to facilitate presentation of normalized (i.e., presented in non-dimensional form ranging between 0 and 1) computation results with respect to $L_o$ ($L_o=121.92$ cm) for die length, $T_o$ ($T_o=15.24$ cm) for die thickness, and $W_o$ ($W_o=30.48$ cm) for die width. The chart of FIG. 5 discloses the resulting TIR of the die surfaces in view of a proposed non-dimensional thickness ($T/T_o$) and width ($W/W_o$).

Figure 6A:
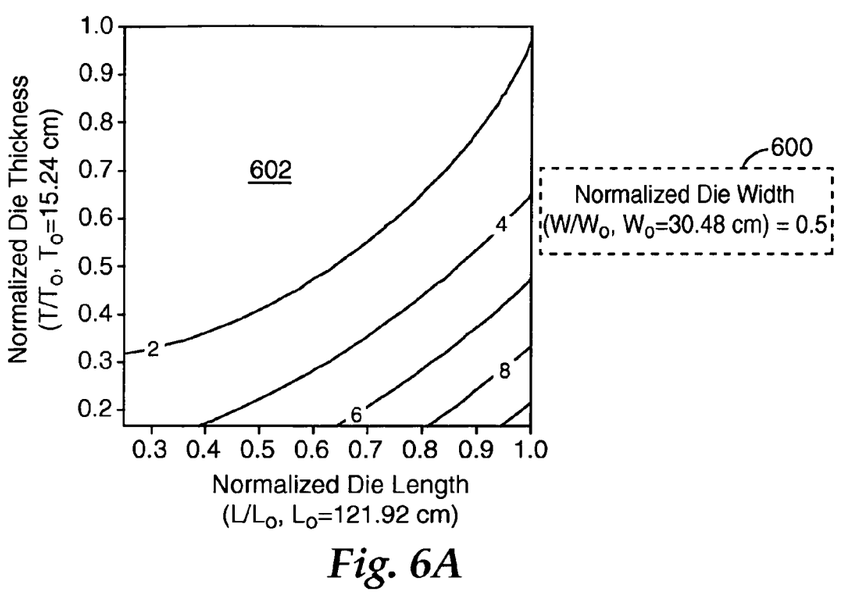
FIG. 6A depicts another exemplary embodiment of a screen for presenting TIR as a function of dimensions of the die.
Figure 6B:
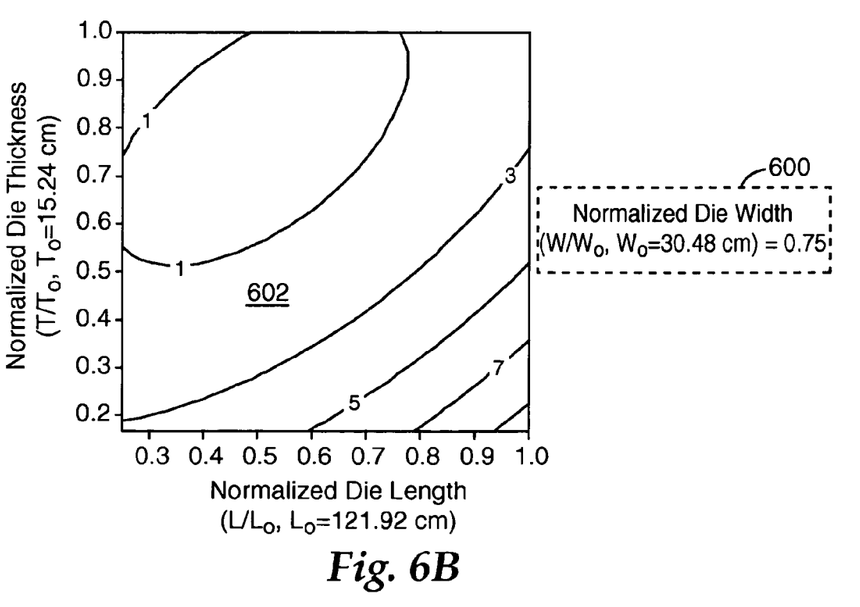
FIG. 6B depicts yet another exemplary embodiment of a screen for presenting TIR as a function of dimensions of the die.

As can be seen from FIG. 5, an outer loop (of a pair of nested loops) initially selects the overall width to be equal to 0.5 (this is a normalized, e.g. non-dimensional, value ranging from 0.5 to 1, as are all values stated with reference to FIGS. 5, 6A, and 6B). Then, an inner loop progressively steps the overall thickness through a set of parametric normalized values ranging from 0.1667 to 1.0. At each of the stepped-through values, the TIR of the die surface is calculated, based upon Equation 3. The results are then plotted parametrically on a Cartesian plane, with TIR measured along the y-axis (ordinate), normalized die thickness measured along the x-axis (abscissa), and normalized die thickness data presented parametrically. As the inner loop calculates the TIR for each thickness value between 0.5 and 1.0, the calculated TIR is plotted on the Cartesian plane, as a function of normalized die thickness. The values for a given normalized width are then connected with a line. To indicate that all of the values just plotted correspond to an overall normalized die width of 0.5, the each line is coded with a symbol and a line type keyed to the parametric value of the normalized die width. In this case, the line is coded with a solid diamond and plotted using a solid line, and a legend, shown by reference numeral 502, is included identifying the line as corresponding to an overall width of 0.5.

Next, the outer loop assigns a value of 0.667 for the overall width. Again, the inner loop progressively steps the overall thickness through a set of values ranging from 0.1667 to 1.0. At each of the stepped-through values, the TIR of the die surface is calculated, based upon Equation 3. The results are then plotted on the aforementioned Cartesian plane. The values are once again connected with a line. To indicate that all of the values just plotted correspond to an overall width of 0.667, a different plot symbol (i.e. open square) and/or line type is selected, and, again, the legend 502 contains information so indicating.

The outer loop continues its operation, stepping through values from 0.667 to 1.0, while the inner loop steps through values from 0.1667 to 1.0, until the chart of FIG. 5 is created. Further, the chart may include a line 504 indicating the maximum TIR allowed for the die halves, computed from a selected coating uniformity (2% in the case of FIG. 5), rheological parameter (i.e. power law index, n) of the coating material discharged through the applicator slot (n=1 in the case of FIG. 5) and die slot height $H_o$ (250 microns in the case of FIG. 5). Thus, any combination of thickness and width falling below the maximum allowable TIR line (e.g. the line for $W/W_o=1.0$ for $T/T_o>0.6$) may be an acceptable design choice from the point of view of yielding a die that operates so as to apply a coating exhibiting the desired coating uniformity. FIGS. 6A and 6B depict another embodiment of presenting the acceptable ranges for two unspecified dimensions, in light of a third chosen dimension. In the context of FIGS. 6A and 6B, none of the dimensions have been specified; however, in each case, a maximum maximum desired die length $L_o$ (assuming $L_o=L_o'=121.92$ cm), maximum overall die thickness $T_o$ (assuming $T_o=T_o'=15.24$ cm), and maximum overall die width $W_o$ (assuming $W_o=W_o'=30.48$ cm) were selected to facilitate presentation of normalized computation results. Thus, a triple-nested loop may be employed to generate TIR values throughout each combination of possible normalized length (abscissa), normalized thickness (ordinate) and normalized width (as shown by legend 600) of the die halves.

FIG. 6A presents a chart that presents TIR data 602 as a series of contour plots (i.e. contour curves of constant TIR) for a die having a normalized overall width of 0.5. FIG. 6B presents a chart that presents TIR data 602 for a die having a normalized overall width of 0.75. There may be as many charts as there are possible values for the overall width of the die halves. Each chart is constructed as described generally with respect to FIG. 5, i.e., a pair of nested loops steps through two variables (in this case, thickness T and length L), and calculates the TIR resulting from each pair of values. Instead of presenting such data as a line, the data may be presented on a Cartesian plane with normalized die length measured along one axis (the abscissa in this case), and normalized die thickness measured along the other axis (the ordinate in this case). The TIR at each point is indicated by a different contour curve, thereby yielding the chart of FIG. 6A. FIG. 6B is similarly constructed, except that the normalized overall width value has been incremented from 0.5 to 0.75.

The preceding embodiments have been described with reference to a regression that is a function of three dimensions: (1) overall length of the die halves; (2) overall width of die halves; and (3) overall thickness of the die halves. In fact, the TIR data may be regressed to any number of variables or dimensions. Turning to FIG. 1, for example, other dimensions may include the depth of the internal cavity 76, the slope of the surface proximal the slot 100, the height of the landings 134, or any other dimension, aspect, or characteristic of the die halves 80 and 82. Hence, the regression generated by the method of FIG. 3 may be a function of any number of variables (i.e., not just three variables), and in that sense may be considered N-dimensional.

Figure 7:
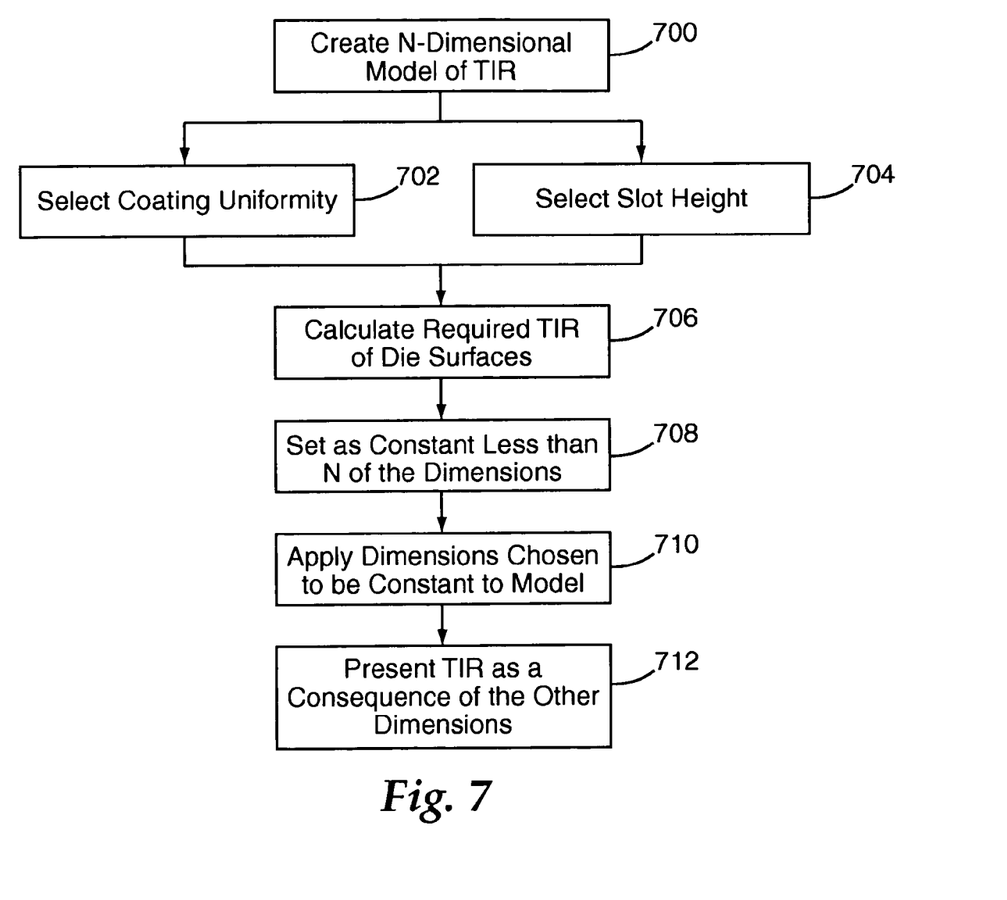
FIG. 7 depicts another exemplary embodiment of a method for presenting appropriate dimensions for a die.

As shown in FIG. 7, a die may be designed taking into account a quantity of N dimensions. Initially, as shown in operation 700, an N-dimensional model of the expected TIR of the die halves is created. As discussed previously, to find the relationship between the TIR of the die surfaces and any number of dimensions describing the geometry of the die halves, an experimental set of dies are machined, and the TIR of each member of the set is measured. The machining variables other than the geometry of the die halves are preferably held substantially constant, to the extent feasible. A set of die halves may then be machined, with various N dimensions of each of the members thereof being varied, so as to adequately represent the full range of the reasonably expected extents of each dimension. The TIR of each die half is then measured, and a regression is performed, finding the relationship between the varied quantity of N dimensions of the die halves and the TIR thereof.

Next, as shown in operations 702 and 704, the desired coating uniformity and slot height are selected. From the selections made in operations 702 and 704, the required TIR of the die surfaces is calculated (operation 706). Then, in operation 708, any number of the N dimensions, including none of the dimensions, may be assigned a value. Thereafter, as shown in operation 710, each of the unassigned dimensions are stepped through their reasonable range of values, and the resulting TIR is determined based upon the model created in operation 700. Finally, the TIR is presented as a function of the unassigned dimensions.

In additional embodiments, the method for designing a die to achieve a desired degree of coating uniformity provides a thermal treatment process for reducing the number of finishing cycles needed to produce a specified die flatness. The material selected for die fabrication was UNS S15500, commonly referred to as 15-5 PH, a precipitation hardening stainless steel available from Crucible Materials Corporation (Syracuse, N.Y.). The die material was a forging that had been vacuum arc remelted to assure cleanliness and subsequently processed to provide the material in the H1025 heat treated condition. The yield and tensile strength of the die material were about 162,700 and 167,000 psi (about $1.12 \times 10^9$ Pa and $1.15 \times 10^9$ Pa), respectively, with elongation around 15%. The experimental blocks were sectioned by the vendor from large forged billets using a large band saw. The grain of the metal forging was oriented parallel to the length of the experimental parts. Each part was marked with a grid of locations to be tracked for material removal and the initial thickness of the part was measured at each of the locations.

Each of the blocks was milled using a Kearney and Trecker Data Mill 700 (Milwaukee, Wis.). The cutting tool was a 4 inch (about 10.16 cm) diameter tool with eight cutting inserts. The inserts were SEKR 1203AFTN-ME13 T25M, a titanium coated carballoy insert from SECO Corporation (Warren, Mich.). Prior to machining the parts, they were put onto the machine table and a dial indicator was used to measure the vertical height variation at each location on the part, relative to an arbitrarily chosen reference. The orientation of the cutter was such that the material was removed by climb milling. The surface feed was typically 200 surface feet per minute (about 6,096 centimeters per minute) with a spindle speed of 200 rpm. The feed normal to the milling direction was 20 inches per minute (about 50.8 cm per minute). The depth of cut varied from 0.100 inch to 0.030 inch (about 0.254 to 0.0762 centimeter) per pass and a sufficient amount of material was removed from each side of the rectangular block to make the parts orthogonal.

An Okamoto surface grinder (Buffalo Grove, Ill.) was used to grind the parts and remove the surface roughness that resulted from the milling process. An 80 grit blue Cubitron™ grinding wheel, 2 inches wide, was used. Prior to grinding the parts, they were put onto the machine table and a dial indicator was used to measure the vertical height at each location on the part, relative to an arbitrarily chosen reference. Wheel balancing was done prior to grinding and wheel dressing was done as needed throughout the grinding process. The table speed was set high with a cross feed of approximately 1 inch per pass over the length of the part. A down feed of 0.0002 inches (about 0.000508 cm) was used for grinding.

The final grinding process was done on a Waldrich Coburg surface grinder (Coburg, Germany) with a universal head and a 80 grit blue Cubitron™ wheel with a 5.5 inch (about 13.97 cm) wide face and a 25 degree angle. Wheel balancing was carried out initially and wheel dressing was done as needed throughout the grinding process. The machinist initially measured the surface of the part using a dial indicator and he determined the approximate amount of material that would need to be removed. Completion of grinding was verified by initially marking the surface with a marker and monitoring until essentially all of the marker was removed.

The feed normal to the length of the parts was set to 0.250 cm/min with an infeed of 0.00005 mm per pass and a table speed of 18 m/min. After the grinding was complete, a number of spark out passes were added, typically 6. Once the grinding was complete, the part was transferred off of the grinding machine and onto a table for measuring. Grinding one side of the part and one measurement was defined as a grinding cycle for this experiment. A total of four grinding cycles were completed on each part. To achieve parallelism and flatness, it is necessary for each part to have two sides ground. One side was identified as the target side where final flatness is evaluated and the other side was identified as the opposite side. The accumulation of four grinding cycles included the sum of grinding on both the target and the opposite side. Four grinding cycles were determined to be the minimum number required to show geometry dependent trends in the final flatness.

Although milling was used as the exemplary machining process in the illustrative embodiments, and grinding was used as the exemplary finishing process, other processes, for example cutting, boring, grinding, sanding, polishing, lapping, electrical discharge machining, and the like, may also be used as machining and/or finishing processes with the thermal treatments described herein to reduce the number of finishing cycles needed to produce a specified die flatness.

Measurement was done on a Zygo scanning incidence interferometer (Sunnyvale, Calif.). The parts were measured in their free state with the length by width plane positioned vertically. To reduce the effects of gravity on the flatness of the parts, they were supported on two points, Bessel points, at approximately ¼ and ¾ of the distance along the length edge. The grinder and interferometer were in a room with about a 1° C. temperature variation peak to valley. The air was exchanged 4-8 cycles per hour. The coolant in the grinder was also temperature controlled to 0.5° C. peak to valley and was exchanged approximately 4-8 cycles per hour.

The flatness of the blocks was characterized before and after each grinding cycle using a Zygo interferometer to obtain a peak to valley measurement of the surface flatness. Each measurement covered the length of the part and a width band of about 3 inches (about 7.62 cm). Measurements were done along both lengthwise edges of each part and on parts that were either 9 or 12 inches (about 22.86 or 122.54 cm) wide. A center measurement was also carried out.

Figure 8:
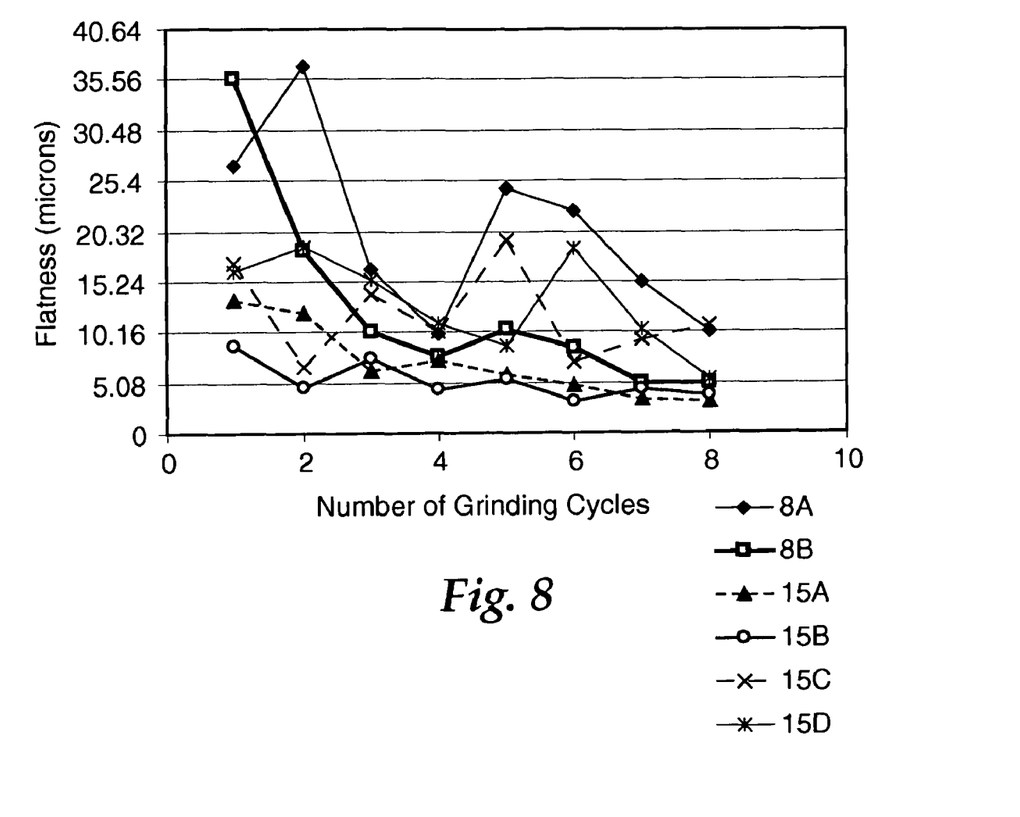
FIG. 8 depicts another exemplary embodiment of a method of using thermal processing to reduce the number of grinding cycles needed to produce a desired degree of die flatness.

FIG. 8 presents a chart that illustrates results obtained for an exemplary method of using thermal treatment to reduce the number of finishing cycles needed to produce a specified die flatness as determined using the Zygo interferometer. Two blocks of the AISI 515500 stainless steel, identified as 8A and 8B, nominally 48 inches (121.92 cm) long by 9 inches (22.86 cm) wide by 1 inch (2.54 cm) thick, were chosen as control samples and were subjected to machining using conventional milling, followed by rough grinding and finish grinding (i.e. polishing) as described above. Four blocks of the AISI S15500 stainless steel, identified as 15A-D and of the same dimensions as blocks 8A and 8B, were chosen for thermal treatment as described above, followed by machining using conventional milling, rough grinding and polish grinding as with samples 8A and 8B.

For the illustrated embodiments, thermal treatment of the stainless steel blocks was as outlined in the ASM International Heat Treater's Guide, Practices and Procedures for Irons and Steels, $2^{nd}$ Edition, and involved heating the steel blocks to 1900° F. (about 1038° C.) and holding at that temperature for approximately 30 minutes per inch of section thickness, then air cooling to room temperature. The heating process was typically done in a vacuum or inert gas atmosphere to eliminate surface oxidation.

Test piece 15A was milled according to the process that was used for all other blocks in the study. After the milling process, it was again heated to the aging temperature, 1025° F. (about 552° C.), for 1 hour. This thermal treatment was intended to relieve any stresses that may have been introduced by the milling process. After the stress-relief heat treatment, the block was rough ground and finish ground using the same procedures that were used for all other blocks in the study.

Test piece 15B was also milled according to the standard process. After milling, it was solution annealed and aged, according to the process described above. The high temperature solution annealing process caused considerable distortion, so the block was unable to continue through the finish grinding process. Following the successful result in using a cryogenic thermal treatment with test piece 15D (described below), test piece 15B was milled again to remove the distortion from its previous thermal treatment. Following milling, 15B was also cryogenically treated in a manner like that use to treat sample 15D. Sample 15B was then rough ground and final ground, the same as all other parts in the study.

Test piece 15C was similarly milled, followed by rough grinding and four cycles of finish grinding. Then, the part was heated to the aging temperature, 1025° F. (about 552° C.), for 1 hour. Next, it was subjected to four additional grinding cycles.

Test piece 15D was processed similar to 15C in that it was milled, rough ground and final ground for four grinding cycles. Then, it was subjected to a cryogenic thermal treatment. The part was slowly cooled to −300° F. (about −184° C.) then slowly ramped back to room temperature. While not wishing to be bound by any particular theory, we believe that this type of treatment may relieve internal residual stresses. After the thermal treatment, the part was rough ground and final ground according to the standard process used on all other parts in this study.

While not wishing to be bound by any particular theory, it is believed that following this thermal treatment, the stainless steel material is in the solution annealed condition, which consists of a supersaturated solid solution because of the unique alloying elements. An increase in hardness and strength can be obtained by inducing the supersaturated alloying elements to precipitate out of the solvent metal as fine particles. This is done through an additional thermal treatment involving aging the material at various specified temperatures. The resulting mechanical properties of the die materials were found to be dependent on the time and temperature applied in the thermal treatment.

All of the thermally treated alloys used in this study were exposed to an aging temperature of 1025° F. (about 552° C.) for 4 hours. As detailed in the ASM International Heat Treater's Guide, the designation of material after this thermal treatment is the H1025 condition. In this condition, the material may be readily machined using standard machining practices. In some embodiments, an advantage of this alloy and heat treatment practice is that quenching, as may be necessary for common carbon-, alloy- and Martensitic-stainless steels, may not be required, thereby minimizing the distortion associated with stresses introduced by quenching.

At the completion of the experiment, data existed for each design point including the length, width, thickness and final flatness after 4 grinding cycles. The data were entered into a statistical software package, Minitab® Release 14.20 Corporate Edition. The software was used to estimate the regression coefficients needed to fit a response surface model to the experimental data. With three variables, the maximum order of the polynomial fit for the response surface was second order plus the cross terms and a constant for a total of 10 regression coefficients. The overall fit of the data was achieved to an R-squared value greater than 99%.

The results of the experimentation were integrated with the calculation for the influence of slot height variation and magnitude on flow uniformity for a Newtonian liquid (U.S. Pat. No. 6,813,820 B2) to create a die thickness prediction tool to meet a specified coating uniformity. In further embodiments, the method for designing a die to achieve a desired degree of coating uniformity includes using the die to apply a coating to a substrate. In other embodiments, the method for designing a die includes using the die to operate upon said product, for example, by extruding the product in a molten state to form, for example, a web, rope, or plurality of filaments or fibers having a desired degree of dimensional uniformity. Such methods are known to those skilled in the art, as illustrated, for example, by the references provided in the Background section of this disclosure.

While the invention has been particularly shown and described with reference to various embodiments thereof, it will be understood by those skilled in the art that various other changes in the form and details may be made therein without departing from the spirit and scope of the invention.

The invention claimed is:

1. A computer implemented method for making parts of a die, called die halves, for extruding material or coating material on a web through a die slot defined by die slot surfaces, the method comprising:
   a. selecting a product uniformity percentage;
   b. selecting a slot height of the die and determining a maximum total indicated run-out (TIR) for the die slot surfaces;
   c. for each die half, selecting one or more values for one or more dimensions related to the size of each die half and entering the one or more selected values into a computer user interface;
   d. for each die half, computing, by means of a mathematical model determined by regression analysis of data from a plurality of previously measured total indicated run-out (TIR) corresponding to surfaces of die halves of previously measured dies, a TIR of a surface of the die half defining the die slot, and a range of values for dimensions, not selected in step c, of each die half to attain the selected product uniformity percentage, at the selected slot height, and with the one or more selected values selected in step c, wherein the analysis of data comprises analysis of at least die half lengths, die half widths, and die half thicknesses; and e. machining the die halves, using the selected slot height, the one or more selected values, the computed range of values, and forming the die slot surfaces at or below the determined maximum TIR and within said range of values computed in step d.

2. The method of claim 1, in which the die has an internal cavity upstream of and connected to the slot and through which coating material is to be discharged.

3. A method of coating comprising: extruding a material through a die slot using a die, having a part or parts, called die halves; applying the extruded material as a coating to a substrate web, wherein the coating exhibits a selected product uniformity; and the die slot is made in accordance with claim 1.

4. The method of claim 1, in which the die comprises first and second halves which at least in part form the die slot, and the mathematical model is of the form $TIR=C_1+C_2L_o+C_3W_o+C_4T_o+C_5L_o^2+C_6W_0^2+C_7T_o^2+C_8L_oW_o+C_9L_oT_o+C_{10}W_oT_o$ in which $C_1$-$C_{10}$ represent constants found by the regression analysis, $L_o$ represents length, $W_o$ represents die width, and $T_o$ represents thickness of a die half.

5. The method of claim 1, wherein machining the die halves involves one or more of cutting, boring, milling, grinding, sanding, polishing, lapping, and electrical discharge machining.

6. The method of claim 1, wherein the die comprises metal.

7. The method of claim 6, further comprising thermally treating the die halves at a cryogenic temperature after machining them.

8. The method claim 7, further comprising grinding the die halves after thermally treating them.

9. The method of claim 6, further comprising thermally treating the die halves by heating the metal to a temperature above 550° C., cooling the metal to a temperature below 550° C., and maintaining the metal at a specified temperature for a specified time.

10. The method of claim 1, wherein the surface of the die halves is machined to a flatness no greater than one half the TIR computed in step d.

11. The method of claim 1, wherein the die includes a first die half and a second die half which cooperate to form a die cavity connected with the die slot, a surface of the first die half cooperates with a surface of the second die half to define the slot height, and the one or more values selected in step c are selected from dimensions of the first die half, dimensions of the second die half or dimensions of both die halves defining at least one of the die slot length, width or height.

12. The method of claim 11, wherein the computed TIR is computed for all of the surfaces defining the die slot.

13. A computer implemented method for making parts of a die, called die halves, for extruding material or coating material on a web through a die slot defined by die slot surfaces, the method comprising:

a. selecting a power law index of a fluid material to be coated or extruded;

b. selecting a coating or extrudate uniformity;

c. selecting a slot height of the die and determining maximum total indicated run-out (TIR) for the die slot surfaces by solving the following equation for t $$\text{Coating Uniformity} = \frac{(H_o + t/2)^{(2+1/n)} - (H_o - t/2)^{(2+1/n)}}{H_o^{(2+1/n)}}$$

in which $H_o$ is slot height, t is TIR of die slot surfaces, and n is a power law index of the coating material extruded through the die slot;

d. for each die half, selecting one or more values for one or more dimensions, related to the size of each die half, and entering the one or more values into a computer user interface;

e. for each die half, computing, by means of a mathematical model determined by regression analysis of data from a plurality of previously measured TIR corresponding to surfaces of die halves of previously measured dies, a TIR of a surface of the die half defining the die slot and a range of values for dimensions, not selected in step d, of each die half to attain the selected coating uniformity, at the selected slot height, and with the one or more values selected in step d, wherein the analysis of data comprises analysis of at least die half length, die half width, and die half thickness; and f. machining the die halves, using the selected slot height, the one or more selected values, the computed range of values, and forming the die slot surfaces at or below the determined maximum TIR and within said range of values computed in step e.

14. A method of coating comprising extruding a material through a slot of a die having parts, called die halves, applying the extruded material as a coating to a substrate; and forming the die slot in accordance with claim 13.

* * * * *

UNITED STATES PATENT AND TRADEMARK OFFICE
CERTIFICATE OF CORRECTION

| | |
|---|---|
| PATENT NO. | : 8,355,809 B2 |
| APPLICATION NO. | : 12/303768 |
| DATED | : January 15, 2013 |
| INVENTOR(S) | : Robert A Yapel |

It is certified that error appears in the above-identified patent and that said Letters Patent is hereby corrected as shown below:

In the Specifications

<u>Column 5</u>
Line 60, delete "preceeding" and insert -- preceding --

<u>Column 8</u>
Line 29, delete "maximummaximum" and insert -- maximum --

<u>Column 11</u>
Line 8, delete "515500" and insert -- S15500 --

In the Claims

<u>Column 14</u>
Line 23, in claim 13, delete "a" and insert -- the --

Signed and Sealed this
Thirtieth Day of July, 2013

Teresa Stanek Rea
*Acting Director of the United States Patent and Trademark Office*